(12) United States Patent
Bigler

(10) Patent No.: US 11,488,785 B2
(45) Date of Patent: Nov. 1, 2022

(54) VACUUM CAPACITOR

(71) Applicant: COMET AG, Flamatt (CH)

(72) Inventor: Walter Bigler, Heitenried (CH)

(73) Assignee: COMET AG, Flamatt (CH)

( * ) Notice: Subject to any disclaimer, the term of this patent is extended or adjusted under 35 U.S.C. 154(b) by 0 days.

(21) Appl. No.: 17/420,523

(22) PCT Filed: Feb. 16, 2021

(86) PCT No.: PCT/EP2021/053690
§ 371 (c)(1),
(2) Date: Jul. 2, 2021

(87) PCT Pub. No.: WO2021/170447
PCT Pub. Date: Sep. 2, 2021

(65) Prior Publication Data
US 2022/0044877 A1 Feb. 10, 2022

(30) Foreign Application Priority Data

Feb. 28, 2020 (EP) ..................................... 20160022

(51) Int. Cl.
*H01G 5/013* (2006.01)
*H01G 5/014* (2006.01)
(Continued)

(52) U.S. Cl.
CPC ............. *H01G 5/013* (2013.01); *H01G 5/011* (2013.01); *H01G 5/014* (2013.01); *H01G 2005/02* (2013.01)

(58) Field of Classification Search
CPC .... H01G 5/011; H01G 5/013; H01G 2005/02; H01G 5/014
See application file for complete search history.

(56) References Cited

U.S. PATENT DOCUMENTS

| 2,511,338 A | 6/1950 | Emmett |
| 3,270,259 A | 8/1966 | Oeschger |

(Continued)

FOREIGN PATENT DOCUMENTS

| CN | 105185587 A | 12/2015 |
| JP | 2009129956 A * | 6/2009 |
| SU | 1667166 A1 | 7/1991 |

OTHER PUBLICATIONS

International Search Report and Written Opinion in PCT/EP2021/053690; dated Jun. 4, 2021.

*Primary Examiner* — David M Sinclair
(74) *Attorney, Agent, or Firm* — Pearne & Gordon LLP

(57) ABSTRACT

The present invention relates to a vacuum capacitor (1, 30) comprising an enclosure (9) to contain a vacuum dielectric medium, a first electrode (12) and a second electrode (13) separated by said vacuum dielectric medium, the enclosure (9) comprising a first conductive collar (2) in electrical contact with the first electrode (12) and a second conductive collar (3) in electrical contact with the second electrode (13), the first conductive collar (2) and the second conductive collar (3) being separated by an insulating element (4) of the enclosure (9), wherein the enclosure (9) exhibits at least one protruding edge (6), said protruding edge (6) being in electrical contact with the closest of the first conductive collar (2) or the second conductive collar (3), wherein the vacuum capacitor (1, 30) comprises at least one protection means (7, 37) covering on the outside of the vacuum enclosure the protruding edge (6), wherein the protection means (7, 37) is made at least partially of an elastomer, wherein at least the outer surface (7b, 37b) of the protection means (7, 37) is electrically conductive and is at the same electrical potential as the closest conductive collar to the protruding edge (6), and wherein the outer surface (7b, 37b)

(Continued)

of the protection means (7, 37) has a radius of curvature greater than the radius of curvature of the protruding edge (6).

15 Claims, 4 Drawing Sheets

(51) Int. Cl.
*H01G 5/011* (2006.01)
*H01G 5/00* (2006.01)

(56) References Cited

U.S. PATENT DOCUMENTS

| | | | | |
|---|---|---|---|---|
| 4,415,949 | A * | 11/1983 | Blickstein | H01G 5/14 |
| | | | | 361/296 |
| 4,450,500 | A | 5/1984 | Wollenschlaeger | |
| 6,388,197 | B1 * | 5/2002 | Zhao | H01B 17/325 |
| | | | | 174/140 CR |
| 2011/0030993 | A1 * | 2/2011 | Birrer | H01B 17/44 |
| | | | | 174/140 CR |
| 2012/0145674 | A1 * | 6/2012 | Schellekens | H01H 9/54 |
| | | | | 218/122 |
| 2013/0100574 | A1 * | 4/2013 | Abrecht | H01G 5/14 |
| | | | | 361/279 |

\* cited by examiner

VACUUM CAPACITOR

TECHNICAL FIELD

The present invention relates to the field of vacuum capacitors. More precisely, the present invention relates to a vacuum capacitor comprising a protection means that prevents electrical discharges between protrusions of the enclosure of the vacuum capacitor and nearby components. The protection means are, furthermore, arranged such that the vacuum enclosure of the capacitor are protected against mechanical shocks thereby preventing deformation or damage of the enclosure during transport or subsequently in harsh operational environments.

BACKGROUND OF THE INVENTION

Vacuum capacitors are well known in the prior art and are used in applications where both high frequencies and high power are required. Common applications include, for example, oscillation circuits for use in high power radio frequency transmission, and high frequency power supplies for use in manufacturing semiconductors, solar panels and flat panel displays.

Capacitors comprise two or more conducting surfaces, commonly called electrodes, separated by a dielectric medium (see FIG. 1). In the case of vacuum capacitors, the dielectric medium is a vacuum. Vacuum capacitors typically require high vacuum (below $10^{-6}$ Torr) or ultra-high vacuum (below $10^{-9}$ Torr). The vacuum is maintained inside a gas-tight housing also called enclosure in this application. A typical housing might comprise an insulating element, often a ceramic cylinder, tightly joined with metallic collars which guarantees a hermetic seal so that the high vacuum can be maintained inside the enclosure for the operating lifetime of the capacitor. Capacitance generating surfaces, i.e. the electrodes of the capacitor, are arranged opposite each other inside the enclosure, and owing to the good properties of the vacuum dielectric, permits to use vacuum capacitors with high voltages, typically in the kV range or tens of kV range and taking up relatively modest volumes. For this, the electrode surfaces can be arranged as alternating co-centric cylinders or intertwined spirals to make the best use of available space inside the vacuum enclosure but can basically also have other shapes. Each electrode (or more precisely each set of capacitance generating surfaces) inside the capacitor is electrically in contact with one metallic collar of the housing, but is isolated from the other electrode and the other collar by the dielectric vacuum medium and by the insulating element of the capacitor enclosure. The above described collars can also consist of alloys or other materials provided they are suitably electrically conductive. The collars provide connection possibilities to integrate the vacuum capacitor with other circuit elements of a high power delivery system. Often, several vacuum capacitors are integrated (together with one or multiple coils) into impedance matching boxes.

Vacuum capacitors fall into two principal categories: those with fixed capacitance, in which the geometric relation between the electrodes remains constant, and variable capacitors, for which the shape, orientation and/or separation of one or both electrodes may be varied, thereby varying the capacitance of the device. A bellows arrangement may be used, for example, or a magnet and a coil, or any other arrangement allowing a motion of one of the electrodes with respect to the other electrode.

As mentioned above, vacuum capacitors are commonly used in applications in the semiconductor industry, such as for instance plasma coating and etching processes, in particular those using electric power at 27.12 MHz, 13.56 MHz, 6.78 MHz or other radio-frequency power source. Very commonly, vacuum capacitors are used as tuning elements and are integrated inside impedance matching boxes or other equipment that guarantee optimal power transfer from a radio-frequency generator (with output impedance 50 Ohm) to a plasma processing chamber with dynamic load (i.e. varying impedance). There is a desire to be able to use these impedance matching boxes with higher and higher power, resulting in higher working voltages. Since higher power must be attained without increasing the size of the capacitor or of the equipment in which the capacitor is placed, the power density must increase. This tendency is further aggravated by the fact that power delivery with frequencies lower than 6.78 MHz and even lower than 4 MHz are becoming more frequent, which leads to higher voltages in vacuum capacitors even when using them for the same nominal-power power applications due to their higher impedance at these frequencies.

Due to the necessity to increase the power density, it is therefore primordial that the capacitor is built in such a way as to minimise the possibility of arcing, or any other form of unwanted current flow between the capacitor and the elements around it. Arcing, also known as uncontrolled discharge, corona discharge or dielectric breakdown, occurs when the electric field at any point between the capacitor and another electrically conductive component exceeds a certain breakdown value. This breakdown value is dependent on a combination of parameters including the applied voltage difference, the depth of vacuum inside the capacitor, the gap distance between the capacitor and the component (at the point where they are closest to each other), the air composition (for example humidity content) around the vacuum capacitor, and the physical and electrical characteristics of the capacitor.

The field strength of a vacuum capacitor is the maximum allowable electric field which can be achieved without the occurrence of such uncontrolled discharges. The field strength ultimately limits the operating voltage of the capacitor for a given electrode separation. It is advantageous to achieve the highest possible field strength in a device, because increasing the field strength permits a vacuum capacitor having a particular geometry to be used for high power applications. Alternatively, for a given application voltage, the geometry (dimensions) of a high field-strength vacuum capacitor can be made smaller than that of a capacitor having a lower field strength.

Until recently the limiting factor for the field strength of a vacuum capacitor was generally given by the vacuum breakdown between the electrodes of the capacitor. Nowadays, this problem has been greatly diminished and the limiting factor is often the breakdown between the capacitor and the components around it. This is particularly a problem when the power density must be increased and the impedance matching boxes or other power delivery equipment must remain at the same physical dimensions.

Due to the manufacturing process of the vacuum capacitor involving tightly joining an insulating element, such as a ceramic cylinder, with the conductive elements of the enclosure called the collars, the insulating element of the enclosure extends further in radial direction than the collars, therefore forming a step at the transition between collars and insulating (ceramic) element. As the ceramic and the collars are typically brazed together, the braze filler material can flow when reaching the liquidus temperature during the brazing process and the above-mentioned steps are eventually coated with an electrically conductive material. This is problematic since at the protrusions of these steps, a very high electric field is thus generated. This effect is called field enhancement; the sharper the protrusions, the stronger the electric field at these protrusions and the higher the risk of corona discharge. Hence, an unwanted discharge between a vacuum capacitor and a component nearby can happen between these protruding edges and these components.

In order to circumvent this problem, it has been proposed to place over or close to the protrusions so-called corona rings. The effect of these rings is to "shield" the protrusions and to reduce the risk of corona discharge. The corona rings for vacuum capacitor known in the art are bulk metallic rings or metal sheets shaped as rings. These bulk or shaped metallic corona rings known in the art are heavy, expensive to manufacture and above all not flexible, which leads to problems when mounting them on the edge of the vacuum capacitors enclosure. An example of such a vacuum capacitor is presented in patent application U.S. Pat. No. 2,511,338 A that discloses a vacuum capacitor with corona protection means on the outside of the capacitor. The corona means of these and other prior-art vacuum capacitors are entirely metallic which does not permit to protect the capacitor from mechanical damages besides protecting it from damages due to corona-discharge processes.

The patent application U.S. Pat. No. 3,270,259 A relates to the problem of preventing corona discharge inside the vacuum enclosure of a vacuum capacitor. The protections means, which are arranged inside such an enclosure, do not prevent damages due to mechanical shocks with an object outside of the vacuum and must be made out a material which is vacuum compatible.

Chinese patent application CN105185587A relates to a DC blocking capacitor wherein two plates electrodes are separated by a polytetrafluoroethylene cylindric wall with arc-shaped edges in order to prevent corona discharge. While the form of the cylindric wall can help to prevent corona-discharge, it cannot prevent mechanical damages.

Russian patent application SU 1 667 166 A1 relates to a vacuum capacitor comprising attachment means between the vacuum enclosure and the electrode. These means possess however a radius of curvature smaller than the protruding edges of the vacuum enclosure with the consequence that if these means are electrically conductive, they favour the formation of corona-discharge processes rather than preventing them.

It is therefore a goal of the present invention to propose a novel vacuum capacitor thanks to which the risk of corona discharge is greatly reduced and offering simultaneously mechanical protection for the vacuum capacitor enclosure.

SUMMARY OF THE INVENTION

Thus, the component of the present invention is to propose a novel vacuum capacitor, with which the above-described drawbacks of the known systems are completely overcome or at least greatly diminished.

An element of the present invention is in particular to propose a vacuum capacitor comprising a protection means that permits at the same time to reduce the risk of corona discharge between the capacitor and a component placed nearby and to reduce the risk of mechanical damages of the vacuum enclosure of the capacitor.

According to the present invention, this component is achieved in particular through the elements of the independent claim. Further advantageous embodiments follow moreover from the dependent claims and the description.

In particular, the objects of the present invention are achieved by a vacuum capacitor comprising an enclosure to contain a vacuum dielectric medium, a first electrode and a second electrode separated by said vacuum dielectric medium, the enclosure comprising a first conductive collar in electrical contact with the first electrode and a second conductive collar in electrical contact with the second electrode separated by an insulating element of the enclosure, wherein the enclosure exhibits at least one protruding edge, said protruding edge being in electrical contact with the closest of the first conductive collar or the second conductive collar, wherein the vacuum capacitor comprises at least one protection means covering on the outside of the vacuum enclosure the protruding edge, wherein the protection means is made at least partially of an elastomer, wherein at least the outer surface of the protection means is electrically conductive and is at the same electrical potential as the closest conductive collar to the protruding edge, and wherein the outer surface of the protection means has a radius of curvature greater than the radius of curvature of the protruding edge.

Thanks to such a vacuum capacitor, and especially to the protection means, the electrical field at the protruding edges can be reduced. By choosing the exact shape and dimension of the protection means according to the situation in which the vacuum capacitor is used, the risk of corona discharge between the vacuum capacitor and a component nearby can be diminished or even eliminated. Furthermore, thanks to the deformability of the protection means, the latter provides for a mechanical protection of the vacuum capacitor against mechanical shocks. The deformability also allows that the protection means can better fit on the edge of the vacuum capacitor. Such a protection means is also favorable, since it can accommodate irregularities in the shape of the insulating element of the enclosure. This is particularly advantageous in case the insulating element is a sintered ceramic element because sintered ceramics are not easily manufactured with precise dimensional tolerances. Furthermore, it is advantageous to provide the protection means that are de- and re-attachable to the protruding edge it shall cover and protect. Protection means of the best possible dimensions for the particular application of the capacitor can be then chosen and mounted on the protruding edge to be protected. Examples of suitable elastomers are polytetrafluorethylene elastomers silicone elastomers, or ethylen-propylen-dien-monomer.

In a first preferred embodiment of the present invention, the radius of curvature of the outer surface of the protection means is at least 1 mm large, advantageously at least 2 mm, 3 mm, 4 mm, 5 mm, 6 mm, 7 mm, 8 mm, 9 mm or 10 mm. This ensures that the electric field strength is below a threshold value corresponding to the value at which the risk of corona discharge is high.

In a further preferred embodiment of the present invention, the vacuum capacitor comprises two protruding edges, each of the protruding edge being covered by a protection mean. With this, it is possible to provide for a vacuum capacitor having a common shape while the protruding edges are each covered by a protections means.

In another preferred embodiment of the present invention, the protruding edge is essentially circular and the protection means is in the form of a ring. This allows for providing for a vacuum capacitor whose housing is essentially in the form of a cylinder. Cylindrical symmetries are generally preferred for transmitting high-frequency signal, including high-frequency power signals.

In yet another preferred embodiment of the present invention, the protection means has a round or oval cross-section. With this, it can be guaranteed that the protection means has a cross-section in a form that permits to effectively reduce the risk of corona discharge.

In yet another preferred embodiment of the present invention, the protection means has an essentially semi-conical cross-section with the summit of the cone being oriented towards the closest conductive collar and the base towards the insulating element of the enclosure. With this shape the protection means can easily be fitted to the vacuum capacitor with an extended contact surface along the metallic collar.

In a further preferred embodiment of the present invention, the protection means comprises a recess to accommodate the protruding edge that it covers. With this, the protruding edge can be accommodated inside the protection means. This allows, among others, to have a space saving vacuum capacitor. Furthermore, by providing a recess, it is possible to effectively cover the protruding edge.

In another preferred embodiment of the present invention, the outer surface of the protection means and the outer surface of the insulating element of the enclosure are in contact and form an angle less than or equal to 90°. With this, the electrical field generated, where the protection means is in contact with an insulation element of the housing, is smaller than the threshold value for the production of corona discharge.

In yet another preferred embodiment of the present invention, the protection means is made at least partially out of an not inflammable material according to one of the V1 or V0 classifications of the UL94 standard year 2013. This guarantees that, in the improbable case of corona discharge, no flame is created and sustained at the protection means.

In a further preferred embodiment of the present invention, the protection means is made out of an insulating material coated with an electrically conductive material. This allows for a simple way of providing effective protection means.

In a further preferred embodiment of the present invention, the protection means is coated with aluminum or silver. This permits to guarantee that the outer surface of the protection means is conductive.

In yet another preferred embodiment of the present invention, the protection means is made of a material which can repeatedly be cycled between room temperature and 150° C. without aging. This has the advantage of permitting long lifetime of the vacuum capacitor because during operation with high power, the vacuum capacitor can heat up to approximately 125-145° C.

In yet another preferred embodiment of the present invention, the protection means is made out at least partially of a compound combining an elastomer matrix, such as polytetrafluorethylene elastomers, silicone elastomers or Ethylen-Propylen-Dien-Monomer (EPDM) and a conductive matrix filler, such a powder comprising nickel and/or graphite particles. This has the advantage that long life performance can be ensured even if the capacitor is operated in an oxidizing environment. Compared to coated protection means this has the additional advantage that there is no risk of delamination of the coating with thermal cycling.

In another preferred embodiment of the present invention, the protection means is attached to the housing by means of an adhesive. With this, it can be ensured that the protection means cannot detach from the vacuum capacitor.

In yet another preferred embodiment of the present invention, the adhesive is electrically conductive. This allows for a simple and effective way of electrically contacting the outer surface of the protection means with the closest collar.

In a further preferred embodiment of the present invention, the capacitor is a variable vacuum capacitor or a fixed vacuum capacitor. A variable capacitor has the advantage that its capacitance can be adjusted by adapting the distance between the electrodes or extent of the overlap of the electrode surfaces inside the vacuum dielectric medium.

DETAILED DESCRIPTION OF A PREFERRED EMBODIMENT

Figure 1:
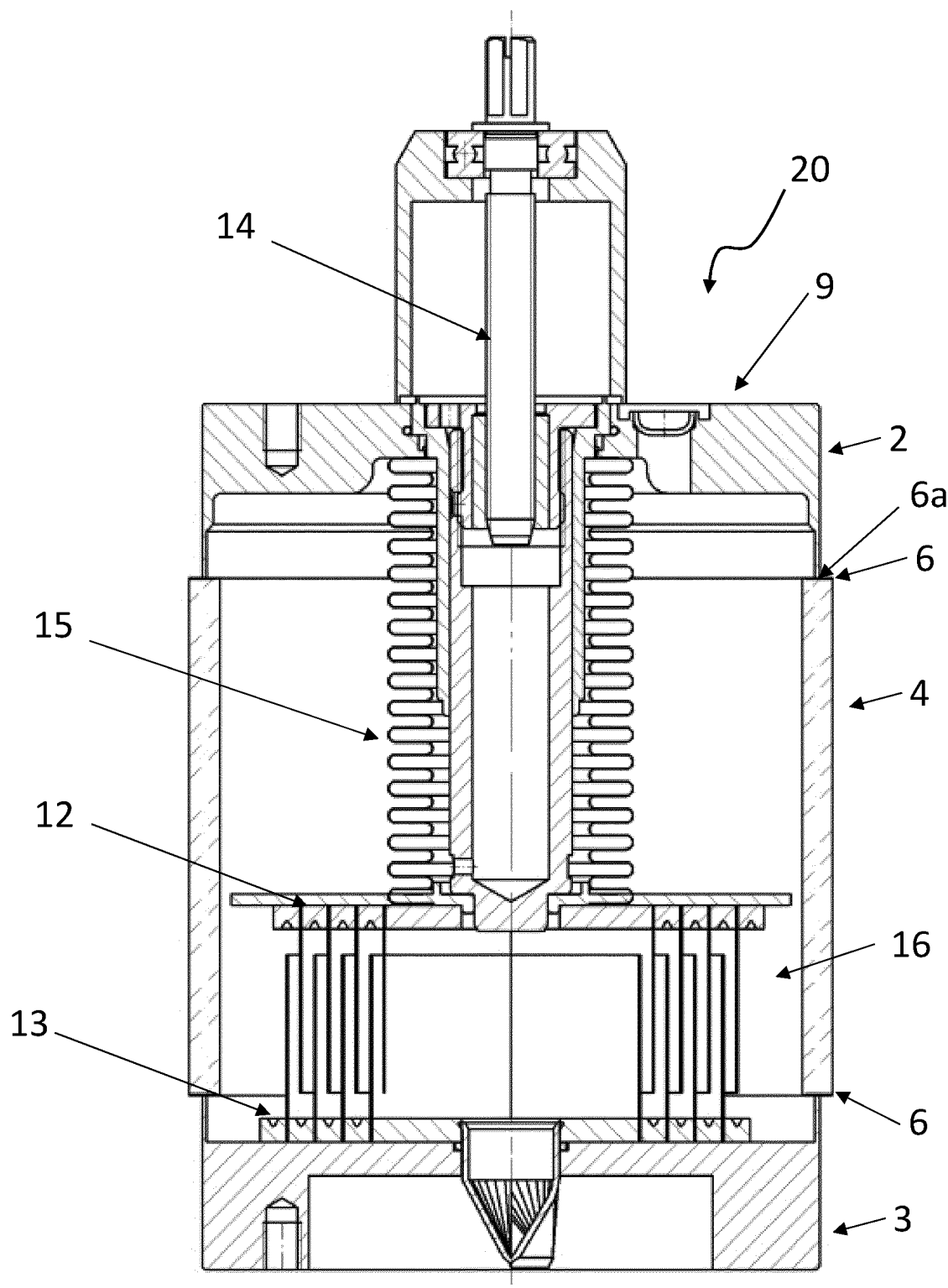
FIG. 1 is a section view of vacuum capacitor known in the prior art.

FIG. 1 shows a section view of a state-of-the-art vacuum capacitor 20. Such a vacuum capacitor comprises an enclosure 9 to contain a vacuum dielectric medium 16; the enclosure comprising a first conductive collar 2 and a second conductive collar 3 (here in the form of metallic collars) separated by an insulating element 4 of the enclosure 9. Commonly the insulating element 4 is made out of a ceramic material in the shape of a cylinder. Due to the manufacturing process and especially due to the requirement associated with the joining, for instance by brazing the insulating element 4 to the metallic collars 2, 3, the insulating element 4 extends further in the radial direction than the collars. Therefore, the insulating element 4 exhibits at least one, in case of FIG. 1 two protruding edges 6. As mentioned, insulating element 4 must be bound to the collars 2, 3, so that the surface of insulating element 4 perpendicular to the collar is eventually covered with a brazing material which is electrically conductive. Due to this brazing material and the resulting electrical connection 6a between the collars 2, 3 and the protruding edge 6, a very high electric field is generated at the protruding edges 6 when the vacuum capacitor is in use. This very high electric field is one of the sources for failure of vacuum capacitors high voltage applications, since corona discharge between vacuum capacitors and components nearby the protruding edge 6 can occur. Also shown in FIG. 1 are capacitive generating surfaces, i.e. electrodes 12, 13, positioned inside the vacuum dielectric 16 and in electric contact with conductive collars 2 and 3 respectively. As is shown in FIG. 1, the vacuum capacitor can be a variable vacuum capacitor with adjustable electrode 12 by using a moving mechanism 14 and expandable bellows 15.

Figure 2:
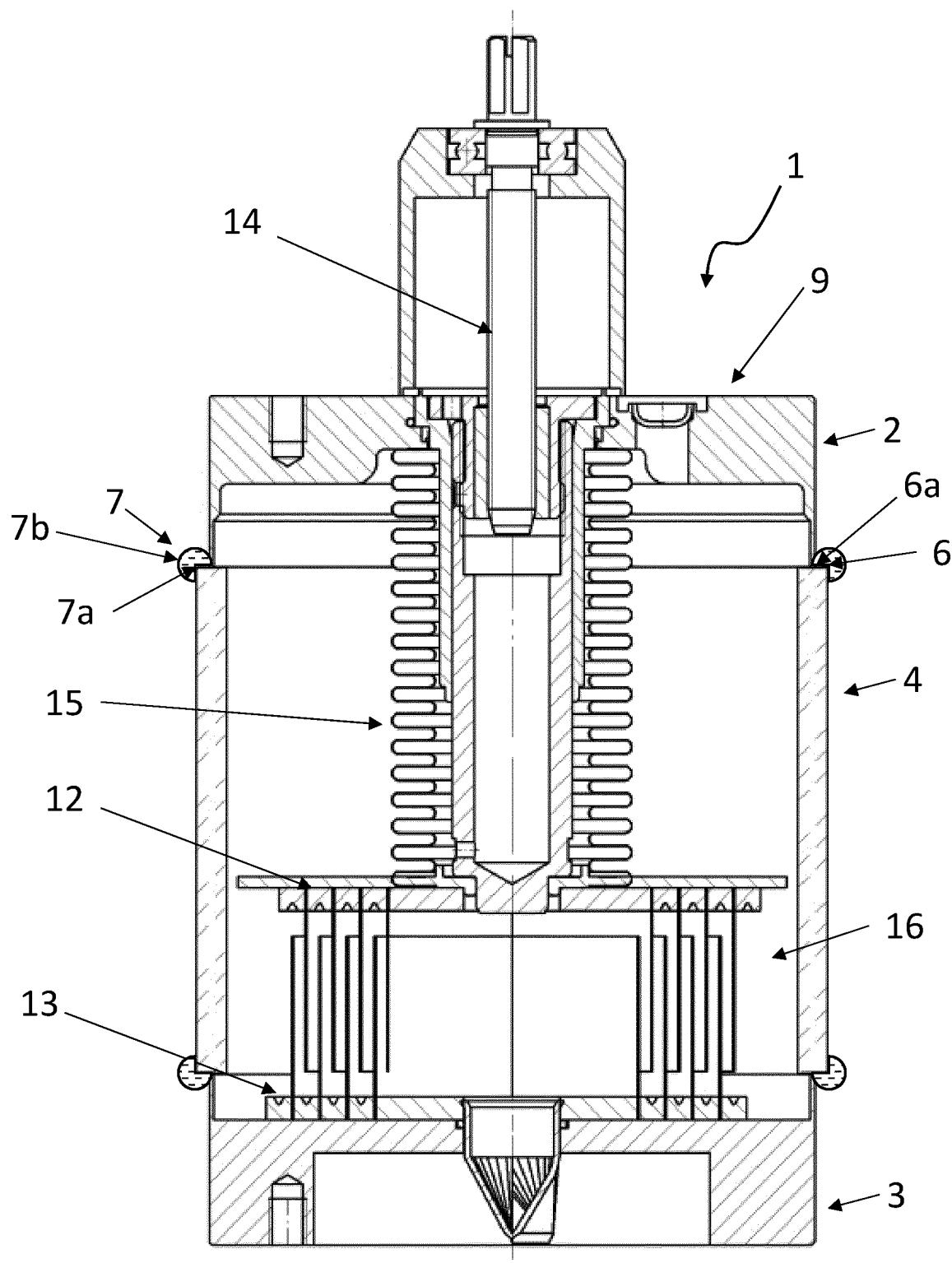
FIG. 2 is a section view of a first preferred embodiment of a vacuum capacitor according to the present invention.
Figure 2A:
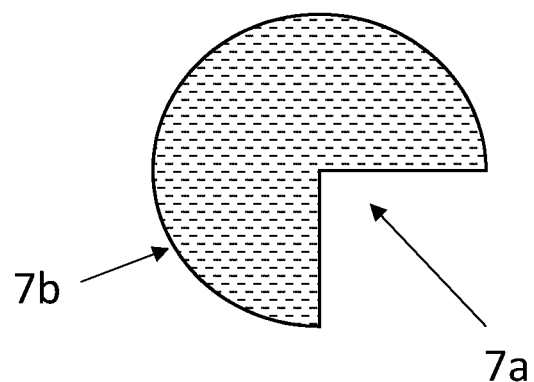
FIG. 2a is a detailed section view of the protection means of a vacuum capacitor according to the first preferred embodiment of the present invention.

FIG. 2 illustrates a section view of a first preferred embodiment of a vacuum capacitor 1 according to the present invention. Similar to the vacuum capacitor 20 known from the prior art, the vacuum capacitor 1 comprises an enclosure 9 comprising a first conductive collar 2, a second conductive collar 3 separated by an insulating element 4 of the enclosure 9. In order to circumvent the problem mentioned above of the high electric field generation at the protruding edges 6, the vacuum capacitor 1 comprises protection means 7 which are covering the edges 6. Advantageously, each protection means 7 provides for a recess 7a in order to accommodate the protruding edge it is covering (see FIG. 2a). Furthermore, the protection means 7 have advantageously the form of a ring. This is favorable since the protruding edges of common vacuum capacitor are circular in shape. The cross-section of the protection means 7, for instance in form of a ring, can be for example round or oval. The skilled person would easily understand that the cross-section of the protection means 7 can have other shapes, depending on the shape of the edge and on the configuration of the vacuum capacitor 1, especially on the configuration of the collars 2, 3 and of the insulting element 4 of the enclosure 9. It is important that at least the outer surface 7b of the protection means is electrically conductive and in contact with the closest of the first or second collars 2, 3. In order to achieve a reduction of the electric field, the radius of curvature of the outer surface 7b of the protection means 7 must be larger than the radius of curvature defined by the protruding edge that it is covering. However, it is not only important that the radius of curvature of the outer surface 7b is larger than the radius of curvature of the protruding edge 6 on a macroscopic scale, but also that the outer surface of the protection means is smooth enough that it does not exhibit microscopic protrusions with radii of curvature smaller than the protruding edges. Surface irregularities in the form of microscopic protrusions, or the presence of particles or clump of particles on the surface, promote the onset of voltage breakdowns because the protrusions or clumps provide where electrons are more easily ejected by field emission, and/or where the ionization and subsequent acceleration of adsorbed particles can be initiated. Both effects can lead to an "avalanche" of electrical charges crossing the medium between the vacuum capacitor and a component nearby in an uncontrolled way.

Figure 3:
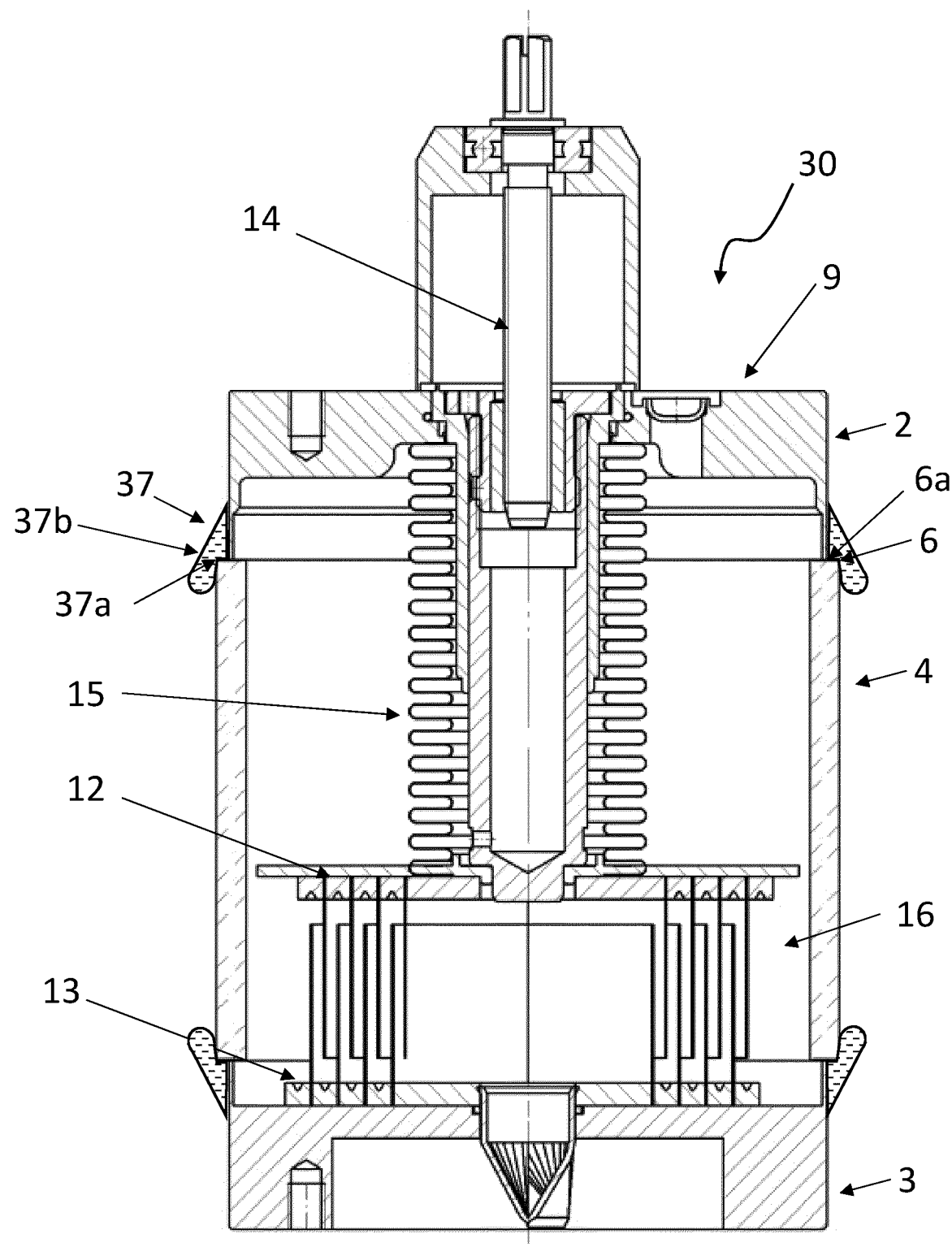
FIG. 3 is a section view of second preferred embodiment of a vacuum capacitor according to the present invention.
Figure 3A:
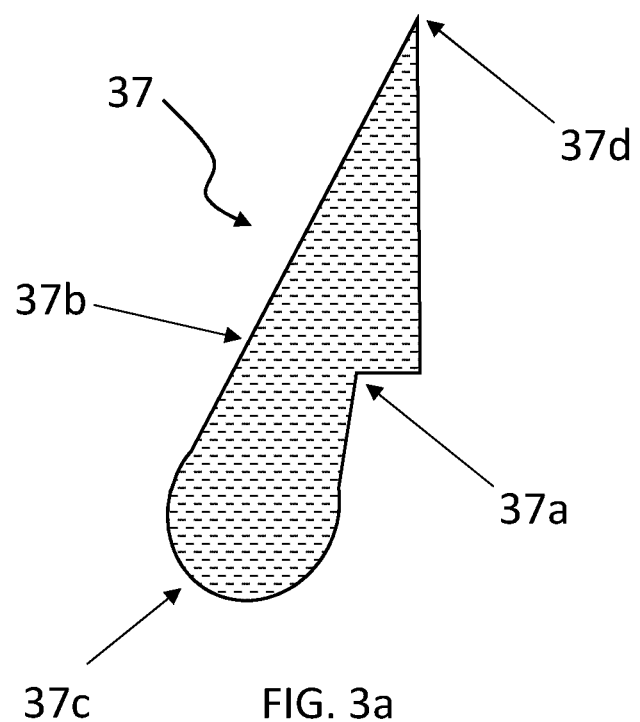
FIG. 3a is a detailed section view of the protection means of a vacuum capacitor according to the second preferred embodiment of the present invention.

FIG. 3 illustrates a section view of second preferred embodiment of a vacuum capacitor 30 according to the present invention. The vacuum capacitor 30, which is otherwise identical to the vacuum capacitor 1, comprises protection means 37 which are covering the edges 6 and which exhibit a slightly different form as the protection means 7. In this embodiment, the extended shape of the protection means 37 along the surface of the collar 2 advantageously allows easier fixing of the protection means 37 because it provides a larger surface area to use, for example, with a metal glue in order to hold in place the protection means. In this embodiment and as shown in FIG. 3a, the protection means cross section is essentially semi-conical with the summit 37d of the cone oriented towards the closest metallic collar and the base 37c oriented towards the insulating element of the enclosure. As can be seen, the base 37c of the semi-cone surface 37b is not perfectly planar but is provided with an angle of curvature to additionally protect against field breakdown along the surface of the insulating element of the enclosure towards the opposite metallic collar 3.

The protection means 7, 37 are, according to the present invention, made at least partially of an elastically deformable material, advantageously an elastomer. This permits to protect the enclosure 4 against mechanical shocks. This can be especially beneficial when the insulating element 4 of the enclosure 9 is made of relatively brittle ceramic material. Therefore, the protection means 7, 37 have two effects; a first one is the reduction of the electrical field strength and therefore minimizing the risk of corona discharge between the vacuum capacitor 1 and a component placed nearby while a second one is the protection of the vacuum capacitor 1, especially of the housing 9, against mechanical shocks. It is important to notice that the deformability of the protection means 7, 37 is not only favorable in order to provide for a mechanical protection, it provides also for a simple assembly of the protection means 7, 37 on the edge 6. Due to the manufacturing process of the insulating element 4, usually done by sintering or other process involving major temperature changes, the dimensions of the latter are not precisely reproducible. A protection means made out of an elastomer has therefore the advantage that it can adapt to these irregularities in the shape of insulating element 4. Moreover, the deformability and elasticity of the elastomer of the protection means 7, 37 can also have the advantage that the protection means 7, 37 can hold on the insulating element 4 by itself. The protection means can alternatively or additionally be attached to the insulating element 4 or other element of the enclosure 9, for instance by using an adhesive, advantageously an electrically conductive adhesive. The later enables a simple electrical connection between the electrodes and the outer surface 7b, 37b of the protection means 7, 37.

Finally, it should be pointed out that the foregoing has outlined two pertinent non-limiting embodiments. It will be clear to those skilled in the art that modifications to the disclosed non-limiting embodiments can be carried out without departing from the spirit and scope thereof. As such, the described non-limiting embodiments ought to be considered merely illustrative of some of the more prominent features and applications. Other beneficial results can be realized by applying the non-limiting embodiments in a different manner or modifying it in ways known to those familiar with the art. It is especially important to notice that is not possible to describe here all the embodiments, in particular all the shapes of the protection means that would result in a reduction of the electrical field strength. Nevertheless, a person skilled in the art will know how to adapt the shape of the protection means to the shape of the vacuum capacitor and to the exact situation where the capacitor is used. It can for instance be advantageous in situations where the space between the capacitor and the closest component is particularly limited in one direction, that the protection means has an elongated shape pointing in another direction. This ensures that the electric field between the outer surface of the protection means and this closest component is below a critical value. It is also important to notice that the protection means covering different edges of the vacuum capacitor can be of different shapes. Finally, even if the vacuum capacitors presented in the preferred embodiment are all variable vacuum capacitors, the present invention relates also to fixed vacuum capacitor exhibiting protections means covering the protruding edges of the enclosure.

The invention claimed is:

1. A vacuum capacitor comprising an enclosure to contain a vacuum dielectric medium, a first electrode and a second electrode separated by said vacuum dielectric medium, the enclosure comprising:
   a first conductive collar in electrical contact with the first electrode;
   a second conductive collar in electrical contact with the second electroded;
   an insulating element separating the first conductive collar and the second conductive collar; and
   at least one protruding edge on an outer surface of the enclosure, said at least one protruding edge being in electrical contact with the closest of the first conductive collar or the second conductive collar, wherein the vacuum capacitor comprises at least one protection means directly covering the at least one protruding edge, wherein the at least one protection means is made at least partially of an elastomer, wherein at least an outer surface of the at least one protection means is electrically conductive and is at the same electrical potential as the closest conductive collar to the at least one protruding edge, and wherein the outer surface of the at least one protection means has a radius of curvature greater than a radius of curvature of the at least one protruding edge.

2. Vacuum capacitor according to claim 1, wherein the radius of curvature of the outer surface of the at least one protection means is at least 1 mm.

3. Vacuum capacitor according to claim 1, comprising two protruding edges, each of the two protruding edges being covered by a said protection means.

4. Vacuum capacitor according to claim 1, wherein the at least one protruding edge is essentially circular and the at least one protection means is in the form of a ring.

5. Vacuum capacitor according to claim 1, wherein the at least one protection means has a round or oval cross-section.

6. Vacuum capacitor according to claim 1, wherein the at least one protection means has an essentially semi-conical cross-section with a summit of a cone thereof being oriented towards the closet conductive collar and a base of the cone being oriented towards the insulating element of the enclosure.

7. Vacuum capacitor according to claim 1, wherein the at least one protection means comprises a recess to accommodate the at least one protruding edge that it covers.

8. Vacuum capacitor according to claim 1, wherein the outer surface of the at least one protection means and an outer surface of the insulating element of the enclosure are in contact and form an angle of less than or equal to 90°.

9. Vacuum capacitor according to claim 1, wherein the at least one protection means is made at least partially out of a not inflammable material according to one of the V1 or V0 classifications of the UL94 standard year 2013.

10. Vacuum capacitor according to claim 1, wherein the at least one protection means is made out of an insulating material coated with an electrical conductive material.

11. Vacuum capacitor according to claim 10, wherein the at least one protection means is coated with aluminum or silver.

12. Vacuum capacitor according to claim 1, wherein the at least one protection means is made at least partially of a compound combining an elastomer matrix and a conductive matrix filler.

13. Vacuum capacitor according to claim 1, wherein the at least one protection means is attached to the enclosure by means of an adhesive.

14. Vacuum capacitor according to claim 13, wherein the adhesive is electrically conductive.

15. Vacuum capacitor according to claim 1, wherein the capacitor is a variable vacuum capacitor or a fixed vacuum capacitor.

* * * * *